(12) United States Patent
Ben-Tsvi

(10) Patent No.: US 11,474,507 B2
(45) Date of Patent: *Oct. 18, 2022

(54) DYNAMIC FABRICATION ENGINE

(71) Applicant: Intrinsic Innovation LLC, Mountain View, CA (US)

(72) Inventor: Ytai Ben-Tsvi, Sunnyvale, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,996

(22) Filed: Jan. 15, 2021

(65) Prior Publication Data

US 2021/0278821 A1 Sep. 9, 2021

Related U.S. Application Data

(63) Continuation of application No. 16/052,418, filed on Aug. 1, 2018, now Pat. No. 10,895,870.

(51) Int. Cl.
   *G05B 19/418* (2006.01)
   *G06F 30/00* (2020.01)
   *G06F 16/901* (2019.01)

(52) U.S. Cl.
   CPC ... *G05B 19/4188* (2013.01); *G05B 19/41865* (2013.01); *G06F 30/00* (2020.01); *G06F 16/9027* (2019.01)

(58) Field of Classification Search
   CPC .......... G05B 19/41865; G05B 19/4188; G05B 19/4093; G05B 2219/35003;
   (Continued)

(56) References Cited

U.S. PATENT DOCUMENTS 5,307,282 A * 4/1994 Conradson ......... G05B 19/4097
                                                                700/103
5,465,221 A    11/1995 Merat et al.
(Continued)

FOREIGN PATENT DOCUMENTS

EP     2110724    10/2009
JP     H10-124130  5/1998

OTHER PUBLICATIONS

Jonas et al., "Digital in situ fabrication—Challenges and opportunities for robotic in situ fabrication in architecture, construction, and beyond," Cement and Concrete Research, Jul. 2018, 112:66-75.

(Continued)

*Primary Examiner* — Chun Cao
(74) *Attorney, Agent, or Firm* — Fish & Richardson P.C.

(57) ABSTRACT

Systems, methods, devices, and other techniques for a dynamic fabrication system. In some implementations, a computing system obtains a digital model of a physical structure. A fabrication plan for the physical structure is generated. The fabrication plan is provided to a fabrication system to execute the automated fabrication procedure according to the fabrication plan. A set of operations are performed for each of at least a subset of tasks from a set of tasks executed by the fabrication system during an automated fabrication procedure to identify an adjusted fabrication plan. The fabrication system is directed to continue execution of the automated fabrication procedure according to the adjusted fabrication plan.

20 Claims, 9 Drawing Sheets

(58) Field of Classification Search
CPC ....... G05B 2219/35012; G06F 16/9027; G06F 30/00; G06F 2119/18; B25J 11/005; Y02P 90/02
USPC .......................................................... 700/100
See application file for complete search history.

(56) References Cited

U.S. PATENT DOCUMENTS

| | | | |
|---|---|---|---|
| 5,523,960 A * | 6/1996 | Jeong | G06Q 10/06 705/7.26 |
| 5,691,895 A | 11/1997 | Kurtzberg et al. | |
| 6,035,243 A | 3/2000 | Galuga et al. | |
| 6,934,594 B2 | 8/2005 | Loring et al. | |
| 8,934,994 B1 | 1/2015 | Lee | |
| 9,630,321 B2 * | 4/2017 | Bradski | B65G 41/008 |
| 10,895,870 B2 * | 1/2021 | Ben-Tsvi | G05B 19/41865 |
| 2007/0282475 A1 | 12/2007 | Schmidt | |
| 2008/0125893 A1 | 5/2008 | Tilove et al. | |
| 2015/0343635 A1 | 12/2015 | Linnell et al. | |
| 2016/0089791 A1 | 3/2016 | Bradski et al. | |
| 2018/0276590 A1 * | 9/2018 | Kubo | B25J 9/0093 |
| 2019/0212720 A1 | 7/2019 | Eriksson | |

OTHER PUBLICATIONS

McEvoy et al., "Assembly path planning for stable robotic construction," IEEE International Conference on Technologies for Practical Robot Applications, Apr. 2014, 6 pages.

PCT International Preliminary Report on Patentability in International Appln. No. PCT/US2019/044599, dated Feb. 2, 2021, 13 pages.

PCT International Search Report and Written Opinion in International Appln. No. PCT/US2019/044599, dated Nov. 21, 2019, 20 pages.

* cited by examiner

DYNAMIC FABRICATION ENGINE

CROSS-REFERENCE TO RELATED APPLICATION

This is a continuation of U.S. application Ser. No. 16/052,418, filed on Aug. 1, 2018, the disclosure of which is considered part of and is incorporated by reference in the disclosure of this application.

FIELD

This specification generally relates to fabrication systems, and more particularly to techniques for automatically translating designs to fabrication plans with reduced complexity, and to techniques for online monitoring of fabrication procedures to permit dynamic adjustments and improve outcomes.

BACKGROUND

Automation can refer to technologies by which a process or procedure is performed without human assistance. Automatic control can refer to use of various control systems for operation of equipment in processes, such as machinery, manufacturing, steering, or stabilization, with minimal or reduced human intervention. For example, manufacturing systems technology can use machine automation and controls to produce products faster and more efficiently. Such technologies often involve using an industrial or manufacturing workcell that can include one or more robots and a robot controller having a programmable logic controller and an actuator assembly that is coupled to a robot arm.

SUMMARY

This specification generally describes systems, methods, devices, and other techniques for a dynamic fabrication system. A computing system can include an automated fabrication engine that directs a fabrication system to assemble a physical structure using multiple components during a fabrication procedure. The fabrication engine can process a digital model of the physical structure, such as a computer-aided design (CAD) file, to generate a fabrication plan that is used by the fabrication system to fabricate (e.g., create parts through additive or subtractive processes, or assemble parts into assemblies) the physical structure. The fabrication engine can generate the fabrication plan with minimal or no human intervention such that minimal task planning and execution for the fabrication procedure can be performed by the computing system without requiring user input.

The fabrication engine can generally include a model processing module and a task planning module. The model processing module can extract information from a digital model of the physical structure, such as components of the physical structure, an arrangement of the components with respect to one another in the physical structure, and a set of fabrication constraints for the physical structure. For example, the model processing module can identify that a physical structure is to be fabricated from rods/sticks and according to specified degrees of freedom.

The task planning module can generate a fabrication plan for executing a set of tasks during the fabrication procedure to complete fabrication of the physical structure. The set of tasks can be identified based on the fabrication constraints included in the digital model for the physical structure. For example, the fabrication plan can specify a set of tasks to be performed during the fabrication operation, a sequence for the fabrication system to execute individual tasks included in the set of tasks, and the dependencies of individual tasks. In some instances, the fabrication plan can specify the parallel execution of individual tasks (e.g., execution of tasks that are not dependent on the completion of one another).

The systems and techniques described herein can provide various advantages in the planning and/or execution of a fabrication procedure. For example, because a design of a physical structure in a digital model is expressed as a set of constraints, there are often many possible end results that satisfy the constraints and therefore qualify as valid outcomes of a fabrication procedure. The large number of valid outcomes often makes it challenging for a computing system to effectively plan the fabrication procedure to identify an appropriate sequence of tasks to perform during the fabrication procedure. The fabrication engine can address these limitations by employing a scoring mechanism to efficiently select a suitable fabrication plan to execute during the fabrication plan. For example, the fabrication engine can use values of scores assigned to execution plans as a filter to identify and evaluate only those fabrication plans that are predicted to have a certain feasibility, thereby reducing the total number of possible end results that the fabrication engine evaluates in planning a fabrication procedure. In this regard, the techniques discussed herein can be used to more quickly and efficiently generate a feasible fabrication plan for a fabrication procedure.

The fabrication engine can monitor the execution of tasks in real-time as the fabrication system performs the fabrication plan and iteratively and dynamically adjust the direction of the fabrication system based on the execution of individual tasks. For example, the fabrication engine can identify a deviation in the actual assembly of the physical structure from the design specified by the digital model and then adjust the execution of remaining tasks to compensate for the identified deviations. In some instances, the fabrication engine can adjust the fabrication plan for the fabrication procedure while the fabrication system is performing the fabrication procedure.

The fabrication engine can apply an iterative monitoring technique to monitor both individual tasks as they are performed by the fabrication system as well as the progression of the entire fabrication procedure. For example, after the fabrication system completes a task specified in the fabrication plan, the fabrication engine can use a set of task-specific execution criteria to monitor and evaluate the execution of the completed task. In this example, the fabrication engine can use the monitoring and evaluation of individual tasks to monitor the progression of the entire fabrication procedure. Because the fabrication engine is capable of monitoring the execution of tasks as they are performed during the fabrication procedure, the fabrication engine can identify the impact of deviations identified during execution of a task on both an upcoming task to be performed by the fabrication system as well as the entire fabrication procedure.

The fabrication engine can also use a prioritization scheme to identify certain constraints that are more important than others during the fabrication procedure. For example, the fabrication engine can use the prioritization scheme to assign higher prioritizations to constraints that have a greater impact on the structural integrity of the physical structure compared to constraints relating to the cosmetic appearance of the physical structure. The prioritizations assigned to the constraints can then be used to adjust the monitoring of tasks that are associated with the constraints. For example, tasks that are associated with higher priority constraints can be more monitored more heavily (and evaluated relative to higher precision requirements) than tasks that are associated only with lower priority constraints.

In some instances, the prioritizations assigned to tasks can be used to adjust the monitoring of tasks as they are performed by the fabrication system during the fabrication procedure. For example, higher priority tasks can be monitored with a greater level of precision compared to lower priority tasks. As another example, higher priority tasks can have lower tolerance levels for determining whether a task has been successfully or unsuccessfully executed based on fabrication constraints.

In some implementations, a method can include the operation of providing, by a computing system and to a fabrication system, a fabrication plan that defines a set of tasks in an automated fabrication procedure for execution by the fabrication system to fabricate a physical structure.

The method can also include performing a set of operations for each of at least a subset of tasks from the set of tasks executed by the fabrication system during the automated fabrication procedure. The operations can include: receiving, by the computing system, execution data that describes information about the execution of the task by the fabrication system, evaluating, by the computing system and using the execution data, the execution of the task with respect to task-level execution criteria to determine a task-level execution performance metric; evaluating, by the computing system, the execution of the task with respect to procedure-level execution criteria to determine a procedure-level execution performance metric; determining, by the computing system, whether to adjust the fabrication plan based on at least one of the task-level execution performance metric or the procedure-level execution performance metric; and if the computing system determined to adjust the fabrication plan, directing, by the computing system, the fabrication system to adjust execution of the automated fabrication procedure according to the adjusted fabrication plan.

One or more implementations of the device may include the following optional features. For example, in some implementations, the fabrication plan defines (i) an arrangement of a plurality of components in the physical structure, (ii) the task-level execution criteria, and (iii) the procedure-level execution criteria.

In some implementations, the fabrication plan specifies a respective priority for each task included in the set of tasks for the automated fabrication procedure; and a priority for a particular task represents a precision level for determining a measure of compliance of the automated fabrication procedure with the task-level execution criteria for the particular task.

In some implementations, the fabrication plan specifies a sequence for executing the set of tasks during the automated fabrication procedure. In such implementations, further includes adjusting, by the computing system, the sequence for executing the set of tasks during the automated fabrication procedure based on the execution data.

In some implementations, adjusting the sequence for executing the set of tasks during the automated fabrication procedure includes: identifying a subsequent task within the sequence for executing the set of tasks after a particular task; and adjusting, based on the execution data, the sequence for executing the set of tasks such that the subsequent task is replaced with a different task.

In some implementations, adjusting the sequence for executing the set of tasks during the fabrication procedure includes: identifying a subsequent task within the sequence for executing the set of tasks after the particular task; and adjusting, based on the execution data, task-level execution criteria for the subsequent task.

In some implementations, the task-level execution criteria for a particular task includes target pose values for one or more components that are associated with the task.

In some implementations, the execution data includes actual pose values for the one or more components that are associated with the task after execution of the particular task. In such implementations, evaluating the execution of the particular task with respect to the task-level execution criteria includes: evaluating the actual pose values for the one or more components and the target pose values for the one or more components; and determining a measure of compliance of the automated fabrication procedure with the task-level execution criteria for the particular task based on evaluating the actual pose values for the one or more components and the target pose values for the one or more components.

In some implementations, the method further includes the operations of: determining, by the computing system, that the measure of compliance of the automated fabrication procedure with the task-level execution criteria for the particular task does not satisfy a threshold compliance measurement; and determining, by the computing system, that execution of the particular task was not successful based on the determination that the measure of compliance of the automated fabrication procedure with the task-level execution criteria for the particular task does not satisfy the threshold compliance measurement.

In some implementations, the procedure-level execution criteria includes at least one of a target structural integrity of the physical structure, and a target geometric arrangement of a plurality of components of the physical structure.

In some implementations, the method includes the operations of: computing, by the computing system and based on the execution data, a state representing a present configuration of the fabrication system after execution of a particular task; and computing, by the computing system and based on the execution data, a state representing a progress of the automated fabrication procedure after execution of the particular task. In such implementations, the computing system determines to adjust the fabrication plan based on the state representing the present configuration of the fabrication system and the progression of the progress of the automated fabrication procedure.

In some implementations, the method includes the operation of computing, by the computing system and based on the execution data, one or more heuristic indicators for a subsequent task to be executed after the particular task during the automated fabrication procedure. In such implementations, the computing system determines to adjust the fabrication plan based on the one or more heuristics indicators for the subsequent task.

In some implementations, the one or more heuristic indicators includes a fitness metric for the subsequent task representing a likelihood that the subsequent task will be successfully executed based on the state representing the present configuration of the fabrication system.

In some implementations, the method includes the operations of: obtaining, by the computing system, a digital model of the physical structure, wherein the digital model identifies a plurality of components for the physical structure, an arrangement of the plurality of components in the physical structure, and a set of constraints for the physical structure; and generating, by the computing system and based on the digital model of the physical structure, the fabrication plan for the physical structure.

In some implementations, the digital model of the physical structure comprises a computer-aided design and drafting (CAD) file of the physical structure.

The details of one or more implementations are set forth in the accompanying drawings and the description, below. The potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
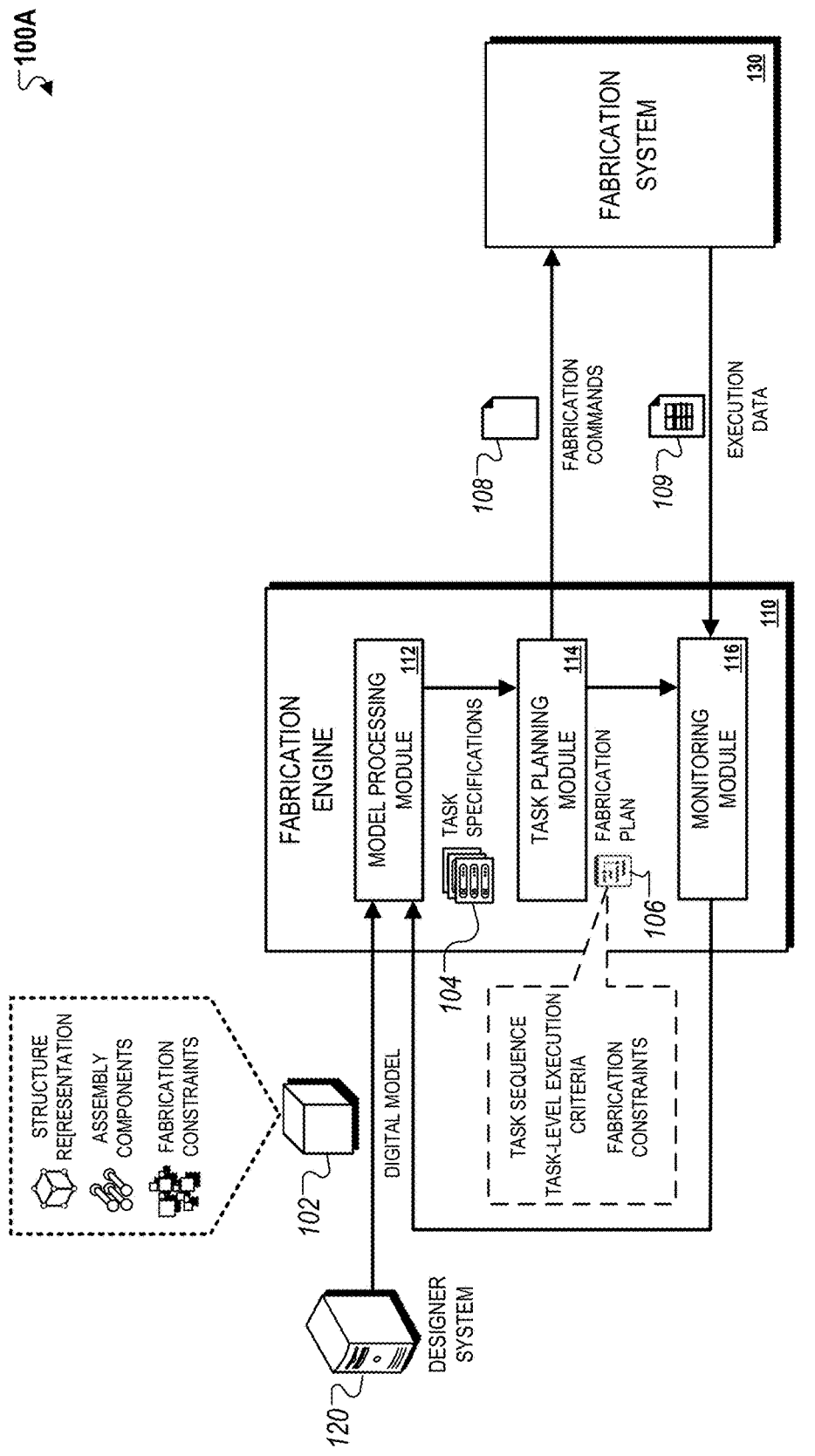
FIG. 1 illustrates an example of a system that includes a fabrication engine that is capable of automating a fabrication procedure.

In general, a dynamic fabrication system can be used to direct a fabrication system to assemble a physical structure during a fabrication procedure with minimal or no human intervention. The dynamic fabrication system can be capable of automating the processing of design constraints within a digital model for the physical structure to generate robotic commands as well as the assembly of physical structure during the fabrication procedure. In this regard, the dynamic fabrication system can be used to minimize or reduce human intervention that is often necessary to process fabrication constraints prior to execution of a fabrication procedure.

As described throughout, the features and components of the dynamic fabrication system can provide various advantages. The dynamic fabrication system can implement techniques that improve the identification of fabrication plans and execution of the fabrication process itself. For instance, the techniques discussed herein can provide efficiencies to a computer system that executes operations specified in a fabrication plan, reduce material waste during a fabrication process, and reduce the need to perform repeat operations of a fabrication process. For example, the dynamic fabrication system can avoid the need to repeat multiple fabrication procedures where the system detects a deviation from an acceptable tolerance during execution of a task. In this example, instead of aborting the entire fabrication process (as may be the case with many fabrication systems), the dynamic fabrication system can adjust the requirements and/or specifications of other tasks of the fabrication process to accommodate the detected deviation and fabricate a physical structure that satisfies constraints for the overall fabrication constraints. This technique can be used to avoid the number of partially assembled structures that are needed to be generated prior to fabricating an entire physical structure.

As another example, the dynamic fabrication system can evaluate fabrication constraints from a digital model of a physical structure with minimal or no human intervention and identify a set of tasks to be executed by a fabrication system during a fabrication procedure of the physical structure. As discussed below, to accomplish this, the system processes the digital model to automatically identify, for example, constraints (e.g., structural integrity requirements), and task-level execution criteria for each identified task (e.g., desired precision level for executing a particular task). The dynamic fabrication system can then generate robotic commands that specify execution of the set of tasks in a specified sequence during the fabrication procedure.

As another example, the dynamic fabrication system can monitor the fabrication procedure online as the fabrication system executes tasks to improve the actual assembly of the physical structure. For instance, the dynamic fabrication system can iteratively evaluate the constraints and task-level execution criteria after the fabrication system executes each task and identify adjustments based on execution data collected by the fabrication system. As an example, if the execution data indicates that execution of a particular task does not satisfy task-level execution criteria, then the dynamic fabrication system can adjust the task-level execution criteria for a subsequent task to be performed during the fabrication procedure.

As described throughout, information collected "online" generally refers to information that is collected and/or processed with minimal delay after the occurrence of a specified event, condition, or trigger. For instance, "online adjustment" by a fabrication engine refers to an adjustment that is processed with minimal delay after a fabrication system performs a specified operation that is sensed by sensors associated with the fabrication system. The minimal delay in collecting and processing the data is based on a sampling rate of execution data of fabrication system as it performs a certain task, and a time delay associated with processing collected execution data.

FIG. 1 illustrates an example of a system 100A that is configured to automate a fabrication procedure. The system 100A can include a fabrication engine 110, a designer system 120, and a fabrication system 130. The fabrication engine 110 can further include a model processing module 112, a task planning module 114, and a monitoring module 116.

Referring briefly to the example depicted in FIG. 1, the fabrication engine 110 receives a digital model 102 of a physical structure to be assembled by the fabrication system 130 during a fabrication procedure. The model processing module 112 processes the digital model 102 to identify a set of tasks to be performed during the fabrication procedure and generates task specifications 104 for the identified tasks. The tasking planning module 114 generates a fabrication plan 106 that specifies task-level execution criteria for execution of the tasks during the fabrication operation. The task planning module 114 generates fabrication commands 108 based the fabrication plan 106.

During a fabrication procedure, the fabrication system 130 executes tasks specified in the fabrication plan 106 based on the fabrication commands 108. The fabrication system 130 also collects execution data 109 while executing the tasks during the fabrication procedure. The monitoring module 116 receives the execution data 109 and evaluates task execution in relation to the task-level execution criteria and the constraints specified in the fabrication plan 106. As discussed below in reference to FIG. 2, the monitoring module 116 can make adjustments to the fabrication plan 106 during the fabrication procedure based on information contained within the execution data 109.

Referring now to the components of the system 100, the designer system 120 can represent any type of computing device that is used by a designer, drafter, architect, or engineer. For example, the designer system 120 can be one or more of a personal computing device, such as a laptop computing device or a desktop computing device that runs computer-aided design and drafting (CADD) software for the design and technical documentation. In other examples, the designer system 120 can be a server system associated with a structural design company.

The fabrication engine 110 and its modules can represent software that is capable of being run on various types of computing devices. For example, the fabrication engine 110 can represent software that runs on a facility computing device located within a manufacturing or fabrication facility. In other examples, the fabrication engine 110 can represent software that runs on a centralized server system that coordinates fabrication procedures in multiple facilities. In some other examples, the fabrication engine 110 can represent software that is executed as a cloud-based service. In such examples, the functionalities of the fabrication engine 110 are accessed remotely through onsite hardware, e.g., onsite controller, within a manufacturing facility. Additionally, in some implementations, the fabrication engine 110 is run on a general-purpose computing device that can be used for other purposes (e.g., scheduling or coordinating multiple fabrication procedures, storing and processing assembly data, etc.). In other implementations, fabrication engine 110 is run on a special-purpose computing device that is specifically designed to control operation of the fabrication system 130. For example, the fabrication engine 110 can be run on a computing device that operates as a robotic controller for the fabrication system 130 and adjusts configuration of robotic joints to perform a specific task or operation.

The fabrication system 130 can be a system that includes a robot, a controller, and other peripheral devices, such as a part positioner and safety environment. The robot (or "workcell") can be used in various environments, such as an industrial or manufacturing environment. In some implementations, the fabrication system 130 is a turn-key cell representing a fully integrated pre-engineered solution. In other implementations, the fabrication system 130 is a custom cell that is built to specific customer specifications and can be designed to address certain limitations and challenges often found in an industrial setting. For example, the fabrication system 130 can be a custom cell that is adapted to handle a certain material and/or perform a certain fabrication procedure that would often be unable to be performed by a standard workcell.

As discussed throughout, the fabrication system 130 can be configured to perform different types of fabrication procedures relating to the assembly of a physical structure. For example, the fabrication system 130 can weld components together, place components relative to one another, or provide support to certain portions of the physical structure while performing a task relating to another portion of the physical structure. Additionally, as discussed in detail below, the fabrication system 130 can perform tasks sequentially (e.g., performing a single task at any given instance of the fabrication procedure), in parallel (e.g., performing multiple tasks at a given instance of the fabrication procedure), or both (e.g., performing a first set of tasks in parallel followed by a second set of tasks to be performed after completion of the first set of tasks).

Referring in more detail to the example depicted in FIG. 1, the digital model 102 can identify a geometric representation of the physical structure, such as a vector representation, a mesh representation, a point cloud representation, among others. Additionally, the digital model 102 can include a three-dimensional representation of the physical structure, or alternatively, two-dimensional side and perspective views.

The digital model 102 can identify descriptions for the physical structure to be assembled during the fabrication procedure. For example, the digital model 102 can include descriptions for each component to be used in fabricating the physical structure. For example, the digital model 102 can specify part type identities, material types, geometry, or a combination of these and/or other descriptions. In some instances, the part descriptions specified in the digital model 102 can be parameterized if the components used to assemble the physical structure are non-fabricated parts.

The digital model 102 can also identify constraints associated with the assembly of the physical structure during the fabrication procedure. The constraints can represent parametric relationships between components, such as dimensional and geometric constraints relationships between components, a range of motion for certain types of component movements and/or arrangements, among others. As examples, the constraints can include a mate/flush constraint used to align component features such as faces, edges, or axis, an angle constraint used to specify an angle between two parts, a tangent constraint used to define a tangential relationship between two parts, or an insert constraint used to insert one component into another.

As a simplistic example, if the physical structure is an arch formed by two links being joined at an apex, the digital model 102 can specify an angle formed by the apex and the two links to be attached to one another by the fabrication system 130 during the fabrication procedure.

The model processing module 112 processes information specified in the digital model 102 to generate a set of task specifications 104. To accomplish this, the model processing module 112 initially identifies a set of tasks to be executed by the fabrication system 130 during the fabrication procedure. Each task can represent a discrete operation and/or movement executed by the fabrication system 130 in association with one or more components from among the components identified in the digital model 102. For example, a "MoveTo" task represents an operation in which the fabrication system 130 moves a component from a first coordinate location to a second coordinate location. Other examples of tasks can include rotating a component, attaching two components, inserting a component into another component, or modifying an existing structure of a component.

Each task specification included in the task specifications 104 can specify information associated with a particular task. For example, if a fabrication procedure involved performing three tasks, then the task specifications 104 would include three task specifications (i.e., one task specification for each task). The task specifications 104 can include values for input parameters, and degrees of freedom for executing a corresponding task. For example, the task specification for the task "PlaceRod" can identify a rod to be manipulated by the fabrication system 130, target pose values for the rod after the task has been executed, and an estimated time to complete the task. In this example, the target pose values for the rod represent output parameters that are implied by the task of placing the rod in a specific location.

The task planning module 114 generates a fabrication plan 106 for executing the fabrication procedure based on the task specifications 104. The fabrication plan 106 can specify, for example, a sequence for executing the tasks identified by the model processing module 112. The task planning module 114 can generate the fabrication plan 106 specifically for the fabrication system 130 to, for instance, maximize the feasibility of executing tasks based on the configuration of the fabrication system 130. For example, the fabrication plan 106 can specify the particular task sequence that maximizes the likelihood that the fabrication system 130 will successfully perform the fabrication procedure. The fabrication plan 106 can also identify task dependencies such that it identifies the predicted impact of a certain task on another task associated with the fabrication procedure.

The fabrication plan 106 can also identify constraints that can be evaluated by the monitoring module 116 while the fabrication system 130 executes the fabrication procedure. The constraints can include constraints corresponding to the entire fabrication procedure. For example, a constraint can refer to a parameter representing a target structural integrity of the physical structure once fabricated by the fabrication system. The fabrication plan 106 can also identify task-level execution criteria that correspond to each task specified in the fabrication plan 106. For example, a task-level evaluation criterion can represent a predicted cost associated with executing a particular task (e.g., time, energy, resources, etc.). As another example, a task-level criterion for a particular task can represent target pose values for a component that is manipulated by the fabrication system 130 while executing the particular task.

The task planning module 114 generates fabrication commands 108 based on the information represented within the fabrication plan 106. For example, the fabrication commands 108 can include joint configurations that are used by a controller to adjust movement of the fabrication system 130 when executing the fabrication procedure. The fabrication commands 108 can be used to control movement of the fabrication system when executing tasks specified in the fabrication plan 106.

Figure 2:
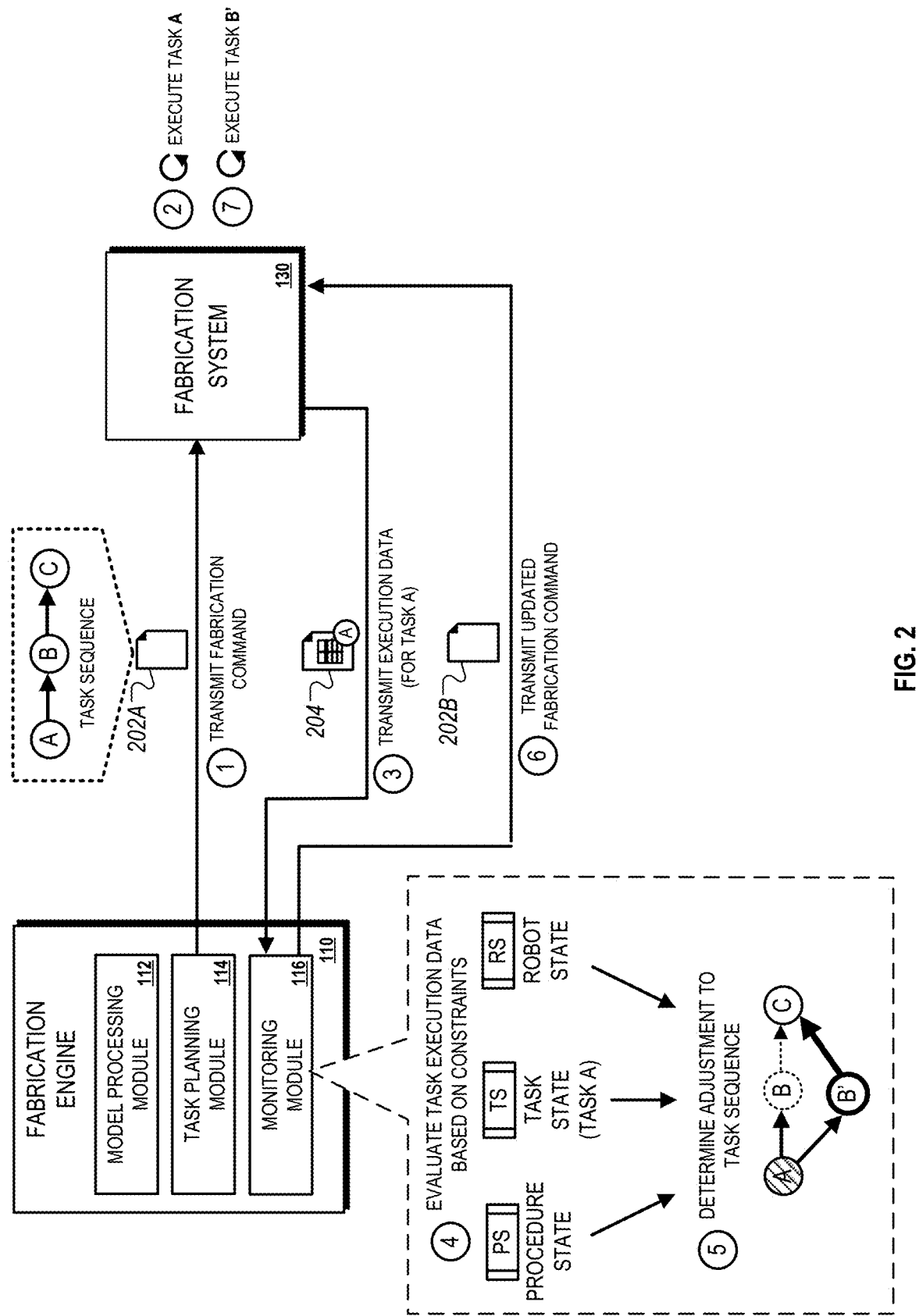
FIG. 2 illustrates an example of a technique for adjusting the execution of an automated fabrication procedure.

FIG. 2 illustrates an example of a technique for adjusting the execution of an automated fabrication procedure. In the example depicted, the fabrication engine 110 monitors the fabrication system 130 as it executes tasks specified within a plan for a fabrication procedure. In this example, the fabrication system 130 collects execution data for each executed task and transmits the data representing the executed task to the fabrication engine 110. The monitoring module 116 then evaluates the execution data for an executed task in relation to constraints specified in the fabrication plan. For instance, the monitoring module 116 can evaluate the actual pose of a component after the task has been executed to a target pose specified in the task specification for the task.

In the example depicted in FIG. 2, the monitoring module 116 determines that an adjustment to the task sequence for the fabrication procedure should be made based on the evaluation of execution data for a first task (A) executed by the fabrication system 130. In this example, the monitoring module 116 can determine an adjustment because, for example, a component has been incorrectly placed by the fabrication system 130, execution of the task (A) does not satisfy constraints specified in the task specification or fabrication plan, or because the actual pose of a component is outside of a tolerance range from the target pose of the component. In such examples, evaluation of an executed task by the monitoring module 116 enables the fabrication engine 110 to dynamically adjust the execution of the fabrication operation by fabrication system 130 to increase the likelihood of successfully assembling a physical structure. Although the example depicted in FIG. 2 illustrates an adjustment to a task sequence by replacing a subsequent task with another task, the fabrication engine 110 can perform other types of adjustments as discussed below.

The adjustment as shown in FIG. 2 occurs as a set of steps. At step (1), the task planning module 114 transmits a fabrication command 202A to the fabrication system 110. The fabrication command 202A specifies a sequence of tasks to be executed by the fabrication system 130 during the fabrication procedure. As shown, the fabrication command 202A specifies the execution of three tasks—task (A), task (B), and (C). The fabrication system 130 executes the tasks such that task (B) performed after task (A) and task (C) is performed after task (B).

At step (2), the fabrication system 130 executes a first task (A). As discussed above, a controller of the fabrication system 130 can be configured to execute instructions specified within the fabrication command 202A for the task (A) that move components of the fabrication system 130.

At step (3), the fabrication system 110 transmits execution data 204 to the monitoring module 116. As an example, the execution data 204 can include output parameters associated with the task, such as actual pose values for a component that is manipulated, moved, or adjusted during execution of the task (A). The execution data 204 can include other types of execution information, such as the amount of time taken to execute the task, energy consumption data, or resources that were utilized in executing the task.

At step (4), the monitoring module 116 evaluates the task execution data 204 for the first task in relation to a set of constraints (e.g., task-level execution criteria for task A, constraints for the fabrication procedure). In performing the evaluation, the monitoring module 116 can compute state information that allows the fabrication engine 110 to track progression of the fabrication operation as each task is executed by the fabrication system 130. For example, the monitoring module 116 can determine a procedure state (e.g., a state representing progression of the entire fabrication procedure), a task state (e.g., a state representing progression of a particular task within a task sequence for the fabrication procedure), or a system state (e.g., a present configuration of the fabrication system 130). The computation of state information is discussed in more detail with respect to FIG. 4A.

The monitoring module 116 can evaluate the execution of the task (A) because on comparing information contained in the execution data 204 and constraints specified in the task specification for the task (A). For example, the task specification for task (A) can specify a predicted position for a component after the task has been completed, and the execution data 204 can identify the actual position for the component. In this example, the monitoring module 116 can evaluate the execution of task (A) based on whether the actual position is within a tolerance range of the predicted position.

At step (5), the monitoring module 116 determines an adjustment to the task sequence for the fabrication procedure based on evaluating the execution data. For example, the monitoring module 116 determines that the actual position of a component is outside the tolerance range of the predicted position specified in the task specification for task (A). Based on this determination, the monitoring module 116 determines that the incorrect placement of the component during the task (A) requires an adjustment before the fabrication system 130 can continue with tasks (B) and (C). This may be because the execution of these subsequent tasks are dependent upon the correct placement of the component during the execution of task (A).

In some implementations, the monitoring module 116 can make adjusts even if the execution data 204 indicates that a task was performed within the acceptable tolerance range of a nominal value specified in the task specification. In such implementations, the adjustment can be to modify the task specification of a subsequent task to accommodate acceptable deviations (e.g., deviations within the tolerance range) to improve the execution of the subsequent task. For example, during a first task, a drill might miss a nominal location for drilling a hole in a piece of material by 1 mm, and the tolerance range was +/−2 mm. In this example, the monitoring module 116 can adjust a second task that involves drilling a complementary hole in a second piece such that the drilling location of the nominal location is adjusted by 1 mm to match the center location of the hole drilled in the first piece during the first task.

The monitoring module 116 then adjusts the initial task sequence specified in the fabrication command 202A to reflect the adjustment based on execution of the task (A) as shown, the monitoring module 116 adjusts the task sequence so that task (B) is replaced with task (B'). In this example, task (B') can represent an ancillary task that adjusts the placement of a component after execution of task (A) so that it more closely resembles the predicted position in the task specification for task (A). In other examples, the task (B') can represent an alternative task to task (B) that involves performing the same type of operation but with a different task specification. For instance, task (B') can have different input parameters based on the deviation of the actual position of a component to a predicted position after completion of task (A). Once the monitoring module 116 updates the task sequence, the fabrication engine 110 generates an adjusted fabrication command 202B based on the updated task sequence.

At step (6), the monitoring module 116 transmits the updated fabrication command 202B to the fabrication system 130. At step (7), the fabrication system 110 executes task (B) instead of task (B) as specified initially in the task sequence within the fabrication command 202A.

The system 100, in various implementations, can use the adjustment technique depicted in FIG. 2 to dynamically adjust and configure the fabrication system 130 as it executes a fabrication operation. For instance, because activity of the fabrication system 130 is iteratively evaluated on a task-by-task basis (e.g., after execution of each task specified in a task sequence), the fabrication engine 110 can perform adjustments in online (e.g., substantially in real-time) to dynamically adjust the specifications for a fabrication operation after the fabrication system 130 has already initiated execution of the fabrication procedure. In this regard, the fabrication engine 110 is capable of dynamically tuning the operation of the fabrication system 130 to improve the likelihood of successfully executing the fabrication procedure based on comparing parameters for predicted activity and actual activity of the fabrication system 130 online.

Figure 3:
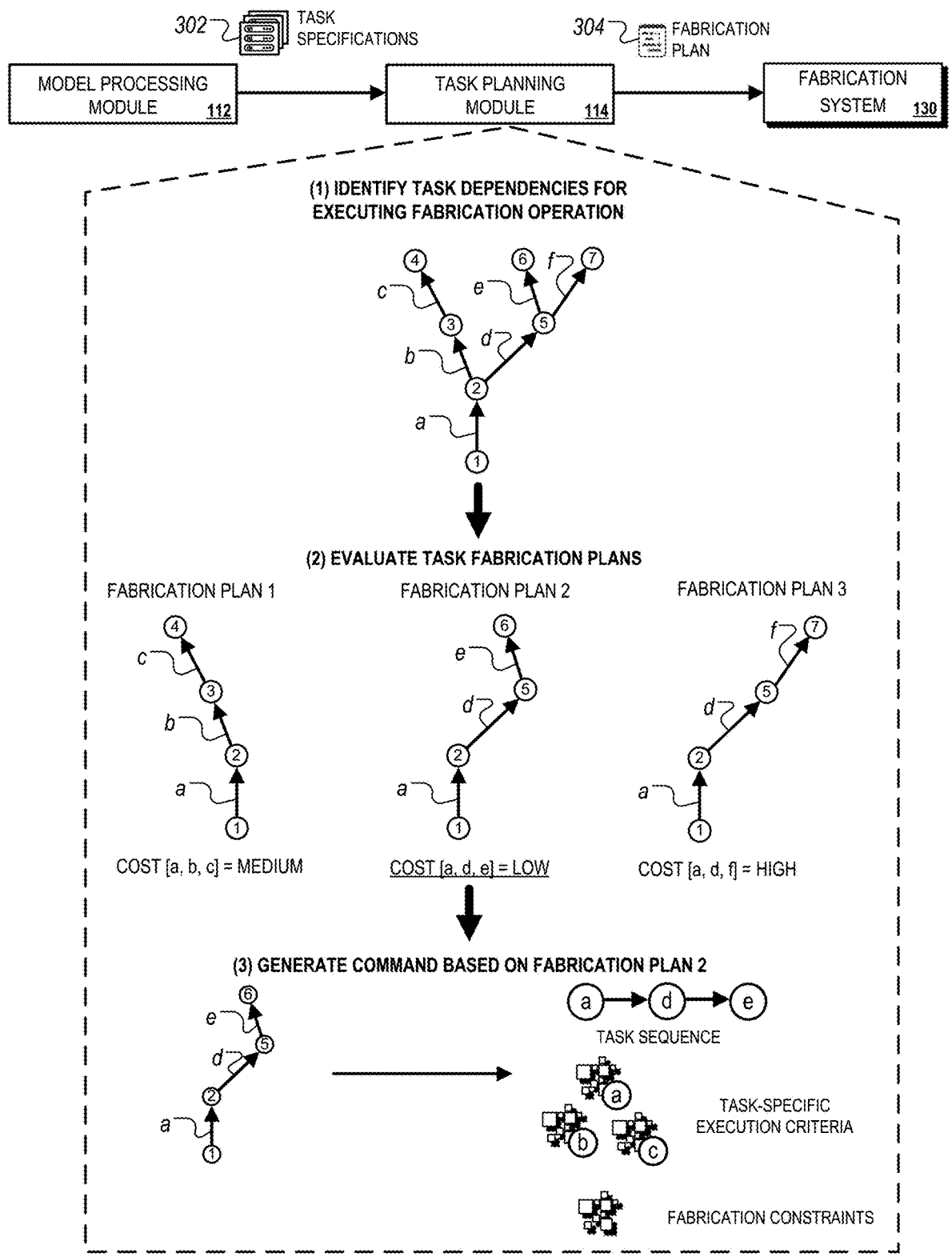
FIG. 3 illustrates an example of a technique for planning a set of tasks for an automated fabrication procedure.

FIG. 3 illustrates an example of a technique for planning a set of tasks for an automated fabrication procedure. In the example, the task planning module 114 identifies a feasible fabrication plan for performing the fabrication procedure based on task specifications 302 generated by the model processing module 112. As discussed above in FIG. 1, the model processing module 112 identifies tasks to be executed by the fabrication system 130 during the fabrication procedure.

In the example depicted in FIG. 3, the model processing module 112 identifies seven possible tasks that can be performed during the fabrication procedure to satisfy the constraints for assembling a physical structure (e.g., tasks "1" through "7"). In this example, tasks "3" and "5" represent alternative tasks for the same operation, whereas tasks "4," "6" and "7" also represent alternative tasks for another operation.

At step (1), the task planning module 114 initially identifies dependencies for execution the fabrication operation. A dependency between two tasks can mean that the input parameters for a first task are dependent on output parameters of a second task. For example, a first task that involves inserting a component into an assembled intermediate structure is dependent on a second task that involves assembly of the intermediate structure.

In the example depicted in FIG. 3, the task planning module 114 identifies dependencies between each of the tasks "1" through "5." The dependencies (e.g., "a" through "f") can be used to develop an execution tree that identifies possible alternative fabrication plans for the fabrication procedure. For example, three alternative fabrication plans can be identified from the execution tree depicted in FIG. 3. As shown, fabrication plan 1 includes tasks "1," "2," "3," and "4," fabrication plan 2 includes tasks "1," "2," "5," and "6," and fabrication plan 3 includes tasks "1," "2," "5," and "7."

At step (2), the task planning module 114 evaluates each alternative fabrication plan in the execution tree. For instance, the task planning module 114 can perform a cost function analysis to determine the most feasible fabrication plan for the fabrication procedure. The cost function may evaluate factors, such as resources needed to execute each task included in a fabrication plan, time required to execute the tasks, a complexity of performing the tasks, a likelihood of successfully executing the tasks, and expected cost of model constraints. The task planning module 114 can apply the cost function such that the costs associated with each task within a fabrication plan are accumulated to compute an overall cost for each fabrication plan.

To apply the cost function, the task planning module 114 can utilize a virtual fabrication system that performs a simulated fabrication procedure with the possible fabrication plans of the execution tree. The virtual fabrication system can have a configuration that is substantially similar to the configuration of the fabrication system 130 such that performance during the simulated fabrication operation can be used by the task planning module 114 to predict the performance of the fabrication system 130 executing the fabrication procedure using a certain fabrication plan.

In some implementations, where the number of possible fabrication plans within an execution tree is large, instead of evaluating each individual execution tree to identify a feasible or optimal fabrication plan, the task planning module 114 can instead use heuristic indicators to evaluate costs associated with executing fabrication plans. In such implementations, because evaluating each possible fabrication plan may be prohibitively expensive, the task planning module 114 can instead assign values to individual tasks that are likely to represent performance bottlenecks. For example, certain task types can be predetermined by the task planning module 114 as having higher performance requirements than other task types. In evaluating the possible fabrication plans, instead of simulating each performance of a fabrication operation with each fabrication plan, the task planning module 114 can select an evaluation plan that has the lowest number of tasks that are known to represent performance-intensive tasks (i.e., identifying possible evaluation plans that have lower complexities compared to other possible fabrication plans. The task planning module 114, in such implementations, can assign fitness values that represent, for example, a complexity metric for each task, or alternatively, each fabrication plan. In other instances, an assigned value can represent a predicted likelihood that the fabrication system 130 will successfully perform a certain task or fabrication plan. For example, tasks that are more resource-intensive and/or more complicated to execute can be assigned with a lower score relative to tasks are less resource-intensive and/or simpler to execute. Values for tasks included in a fabrication plan can also be aggregated to compute an aggregate value for the fabrication plan. In this regard, aggregate values for different alternative fabrication plans can be used to estimate the difficulty of performing the fabrication procedure using different alternative fabrication plans. For example, the task planning module 114 can select a fabrication plan that is assigned the highest aggregate score because this particular fabrication is predicted to have the highest likelihood of success when executed by the fabrication system 130.

In some implementations, the fabrication system 130 can compute fitness scores that indicate a likelihood that following a certain task sequence will result in a successful outcome for the fabrication procedure. The fabrication system 130 can compute fitness scores for each fabrication plan such that a fitness score for a particular fabrication plan represents a respective likelihood that executing a sequence of tasks that is specified by the particular fabrication plan will result in a successful outcome for fabrication procedure. A low fitness score for an execution plan can be used to represent a low likelihood of success of executing a specified sequence of tasks to satisfy the model constraints whereas a high fitness score for an execution plan can be used to represent a high likelihood of success of executing a specified sequence of tasks to satisfy the model constraints. As an example, ten parts total are needed to execute a fabrication procedure and the fabrication system 130 considers the fitness of two alternatives for placing the first 4 parts. If for one of them, the parts that are already placed surround the space where a part that has not been placed should be, the system can conclude, without doing the exact planning, that there is a low chance of success (e.g., low fitness), since the system is unlikely to be able to find a path for the missing part.

In the example depicted in FIG. 3, the task planning module 114 selects "fabrication plan 2" as fabrication plan 304 from among the three alternative fabrication plans. The selection of the fabrication plan 304 based on this fabrication having the lowest associated cost relative to the two other fabrications. For example, "fabrication plan 3" is determined to have a "HIGH" cost, "fabrication plan" is determined to have a "MEDIUM" cost, and the "fabrication plan 2" is determined to have a "LOW" cost. As discussed above, the cost associated with each fabrication plan can be determined based on various factors such as execution complexity, likelihood of successfully executing the fabrication procedure, likelihood of a collision occurring during the fabrication procedure, or a precision level for executing the fabrication procedure.

Once a fabrication plan has been selected, the task planning module 114 generates command to provide to the fabrication system 130. As discussed above with respect to FIGS. 1 and 2, the generated command can specify a task sequence specifying an order in which individual tasks are to be executed during the fabrication procedure. In the example depicted in FIG. 3, the selected fabrication plan includes three tasks "a," "d," and "e" that are to be executed sequentially. The task planning module 114 also identifies task-level execution criteria (e.g., execution criteria specific to each task) and constraints (e.g., constraints corresponding to the entire fabrication procedure).

Figure 4A:
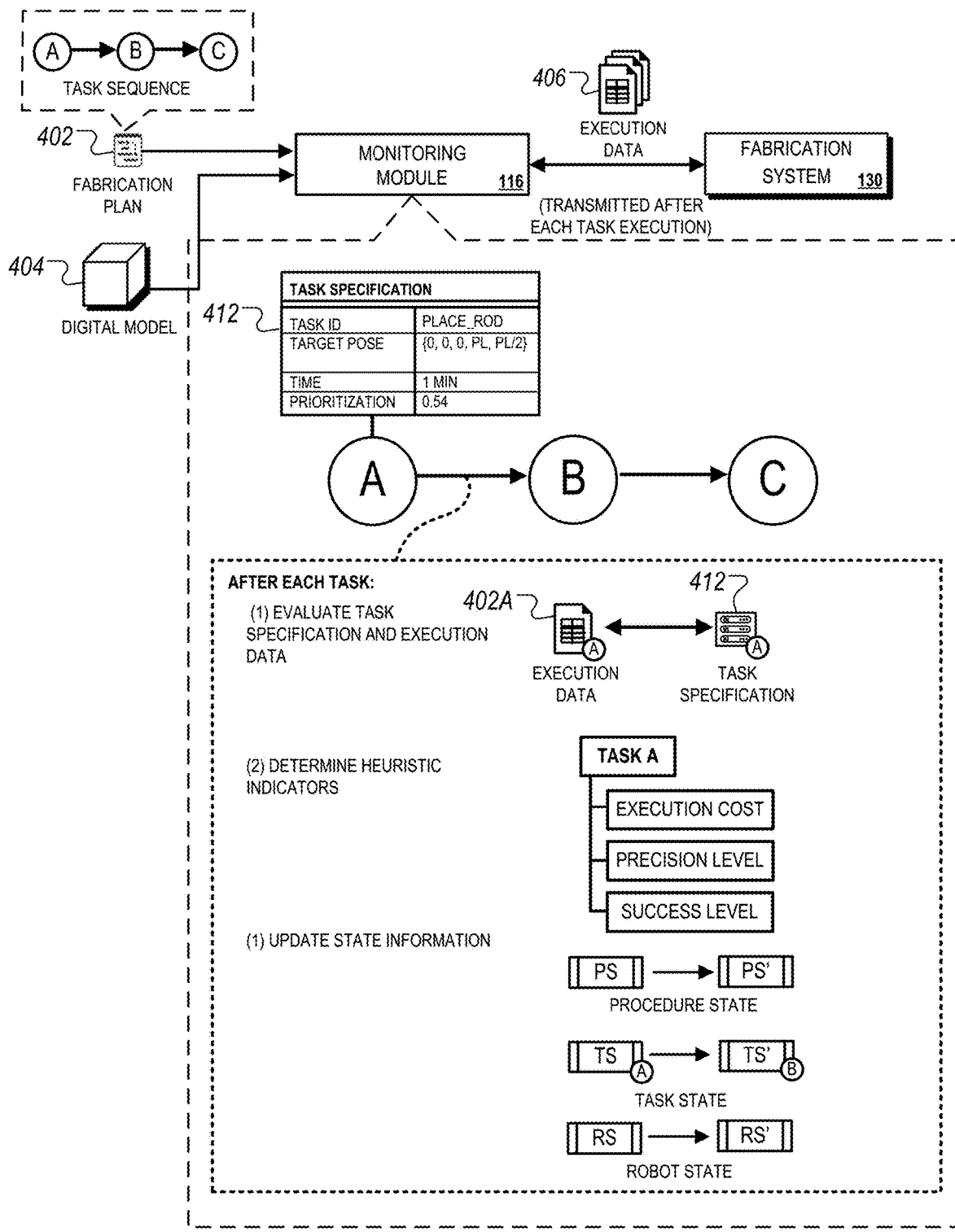
FIGS. 4A-B illustrate techniques for monitoring the execution of an automated fabrication procedure.
Figure 4B:
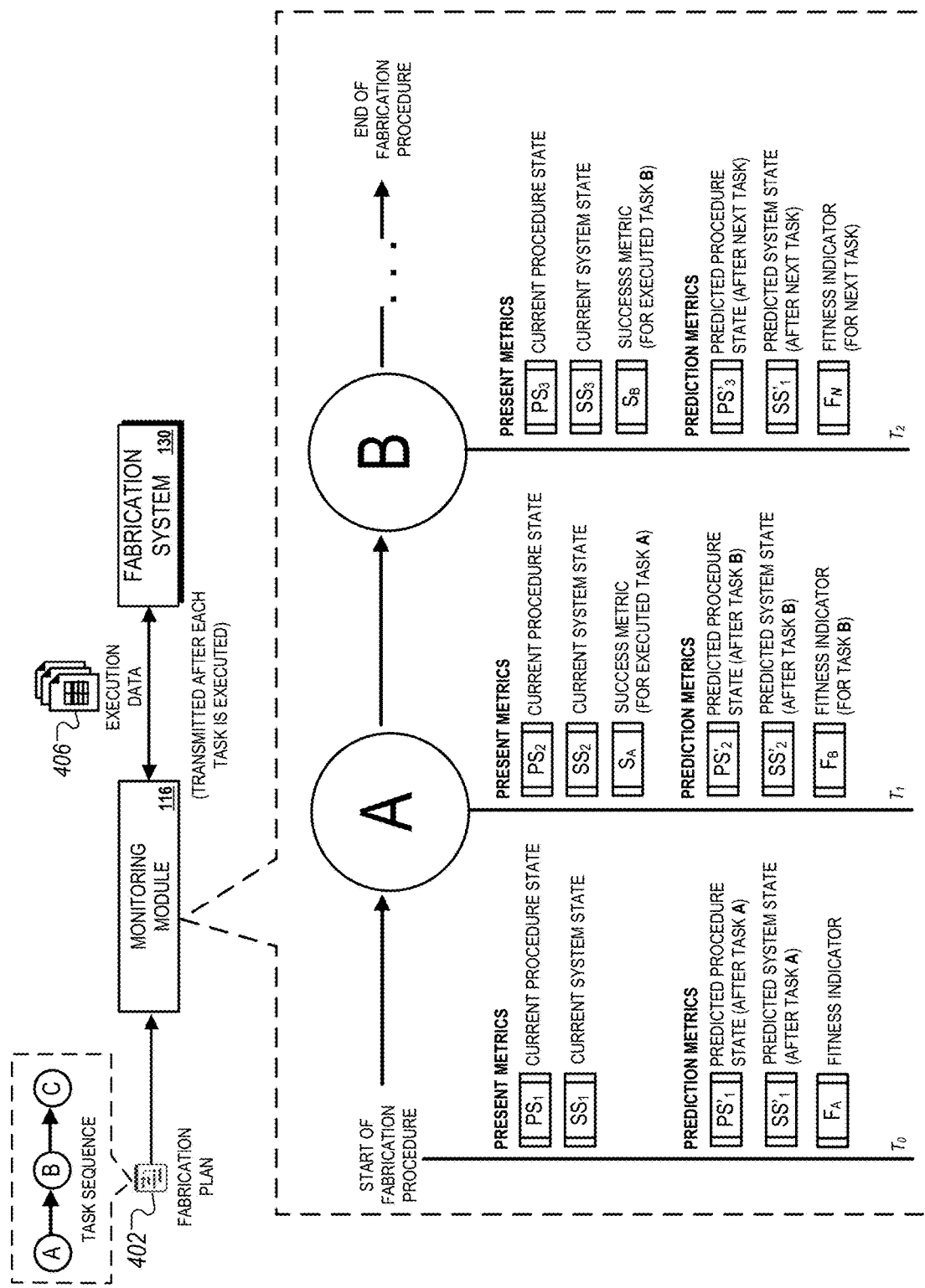

FIGS. 4A-B illustrate techniques for monitoring the execution of an automated fabrication procedure. During the fabrication procedure, the monitoring module 116 receives execution data 406 collected by the fabrication system 130 after it completes each task specified within a fabrication plan 402 for the fabrication procedure. As discussed above, the monitoring module 116 can evaluate the execution data 406 relative to task-specific execution criteria and, in some instances, adjust the fabrication plan 402 if needed to improve the execution of the fabrication procedure. For example, adjustments to the fabrication plan 402 can be used to mitigate any potential errors resulting from execution of the fabrication procedure. In the example depicted in FIG. 2, the monitoring module 116 replaces task to be executed by the fabrication system 130 based on execution data indicating a deviation from a task specification of a recently executed task.

In the example depicted in FIG. 4A, the fabrication plan 402 specifies a task sequence that includes tasks (A), (B), and (C). The fabrication plan 402 includes a task specification 412 for task (A). As shown, the task specification 412 includes a task identifier that includes a label for the task (e.g., "PLACE_ROD"), a target pose for a tool after the fabrication system 130 has executed task (A), an estimated time for executing the task, and a prioritization assigned to task execution.

In the example, once the fabrication system 130 has executed task (A), the monitoring module 116 receives execution data 406 representing information associated with task execution. The monitoring module 116 then evaluates the execution data 402A for the task (A) relative to the task specification 412 (e.g., task-level execution criteria) and the digital model 404 (e.g., constraints). For example, the execution data 402A can identify an actual pose of the tool after execution of task (A), which is compared to the target pose of the tool specified in the task specification 412. In this example, if the actual pose of the tool is within a tolerance range of the target pose in the task specification 412, then the monitoring module 116 determines that the task (A) was successfully performed. Alternatively, if the actual pose of the tool is not within a tolerance range of the target pose, then the monitoring module 116 determines that the task (A) was not successfully performing.

The monitoring module 116 determines heuristic indicators based on evaluating the execution data 402A and the task specification 412. For example, as discussed above, the monitoring module 116 can compare a predicted execution cost (e.g., resources predicted to be required in executing task (A) in the task specification 412 and an actual execution cost (e.g., resources actually utilized by the fabrication system 130) in the execution data 402A.

As another example, the monitoring module 116 can determine, based on the actual pose of the tool in the execution data 402A, whether the fabrication system 130 executed the task according to a precision level specified in the task specification 412 (e.g., whether the actual pose of the tool is within a specified tolerance range of the predicted pose of the tool). In this example, the precision level of the task can be adjusted based on the prioritization of the task in the corresponding task specification. For instance, tasks that have a high prioritization (e.g., prioritization score greater than 0.50) can have higher precision levels than tasks that have a low prioritization (e.g., prioritization score less than 0.50). In such instances, high prioritization tasks can have smaller tolerance ranges from predicted pose values for tools so that the monitoring module 116 applies stricter evaluation standards for high priority tasks. In this regard, tasks that have a more significant impact on the physical structure (e.g., construction of joints near the base of the structure) more strictly evaluated compared to tasks that relate to aesthetic aspects of the physical structure.

As yet another example of a heuristic indicator, the monitoring module 116 can determine a successful level for a task based on evaluating the execution data 402A in relation to the task specification 412. As discussed above, the success level can be determined based on, for example, a complexity associated with executing a task, the number of actions to be performed by the fabrication system 130 in executing the task, the type of actions to be performed, among others. In some instances, the success level can be used to perform dynamic adjustments to the task sequence for a fabrication procedure so that the operation of the fabrication system 130 can be changed to improve the execution of the fabrication procedure.

The monitoring module 116 then updates state information for the fabrication procedure. The states determined by the monitoring module 116 can be used to represent different types of progression as the fabrication system 130 executes tasks specified in the fabrication plan 402. A procedure state ("PS") can represent progression of the fabrication procedure as a whole. A task state ("TS") can represent progression of an individual task specified in the fabrication plan 402. A system state ("SS") can represent a present configuration of the fabrication system 130. In some implementations, the monitoring module 116 determines state information prior to and after the execution of a task by the fabrication system 130.

In the example depicted in FIG. 4A, the procedure state prior to execution of the task (A) is initially "PS." Additionally, the task and system states prior to execution of the task (A) are "TS" and "SS" respectively. Once the monitoring module 116 receives the execution data 402A, the procedure, task, and system states are updated to "PS'," "TS'," and "SS'," respectively. Additionally, because task (B) is executed after the execution of task (A), task state "TS'" represents the task state prior the execution of task (B).

In some implementations, the monitoring module 116 can be configured such that evaluating the execution data for an executed task represents a discrete task that is specified within a task sequence of a fabrication procedure. For example, a task sequence can include tasks (A), (A'), (B), and (B') where tasks (A) and (B) represent tasks relating to the fabrication of a physical structure, and tasks (A') and (B') represents tasks that evaluation execution data for the execution of tasks (A) and (B,) respectively. In such implementations, an adjustment to a fabrication plan based on evaluation of the execution data can also represent a discrete task. For example, an initial fabrication plan can specify a task sequence of tasks (A), (B), and (C) where tasks (A) and (B) relate to the fabrication of a physical structure and task (C) relate to evaluation of execution data for tasks (A) and (B). In this example, if the monitoring module 116 determines, while performing task (C), that (A) was improperly performed, then the monitoring module 116 can adjust the task sequence to include an additional task (D) that involves performing task (A) again.

Referring now to FIG. 4B, an example of a technique for computing metrics during a fabrication procedure is shown. In the example depicted in FIG. 4B, the monitoring module 116 computes metrics at certain time points corresponding to the completion of tasks by the fabrication system 130. For example, time point $T_0$ represents the initial time point before the fabrication system 130 initiates executing the fabrication procedure. Time point $T_1$ represents the time point after the fabrication system 130 completes execution of the task (A) and time point $T_1$ represents the time point after the fabrication system 130 completes execution of the task (B).

During each time point, the monitoring module 116 computes a set of present metrics, which include status information as discussed above in reference to FIG. 4A or an evaluation of execution data for a task recently executed by the fabrication system 130. For example, at time point $T_0$ (i.e., prior to start of the fabrication procedure), the monitoring module 116 computes a current procedure state "$PS_1$," and a current system state "$SS_1$." The monitoring module 116 also computes a set of prediction metrics, which include an anticipated status information after execution of a subsequent task or a fitness indicator for the subsequent task. As discussed above in reference to FIG. 3, the fitness indicator for a task can represent, for example, a predicted likelihood that the task will be successfully executed by the fabrication system 130 before the fabrication system 130 actually executes the task. For example, at time point $T_0$, the monitoring module 116 computes a predicted procedure state "$PS'_1$" and a predicted system state "$SS'_1$."

In the example shown in FIG. 4B, once the fabrication system 130 has completed executing task (A) at time point $T_1$, the monitoring module 116 computes a current procedure state "$PS_2$," a current system state "$SS_2$," and a success metric "$S_A$" for execution of task (A). As discussed above, the success metric can represent an evaluation of task execution by the monitoring module 116 based on constraints specified within the task specification and/or the digital model.

For example, the monitoring module 116 can determine that task (A) was successfully executed if the actual pose for a tool (which, for example, can be represented within the current system state "$SS_2$") is within a specified tolerance range of the predicted pose for the tool (which can be represented within the current system state "$SS_2$"). In this respect, comparison of state information at different time points of the fabrication procedure allows the monitoring module 116 to dynamically evaluate performance of the fabrication system 130. As discussed above, in some instances, if performance of the fabrication system 130 deviates from standards specified by the fabrication constraints, then adjustments can be made online to adapt the execution of remaining tasks for the fabrication procedure.

The monitoring module 116 computes prediction metrics at time point $T_{1\ in}$ the same manner as discussed above for time point $T_0$. For example, the monitoring module 116 computes a predicted procedure state "$PS'_2$," a predicted system state "$SS'_2$," and a fitness indicator $F_B$ for task (B). The monitoring module 116 then iteratively repeats the process discussed above at time point $T_2$ after execution of task (B).

Figure 5A:
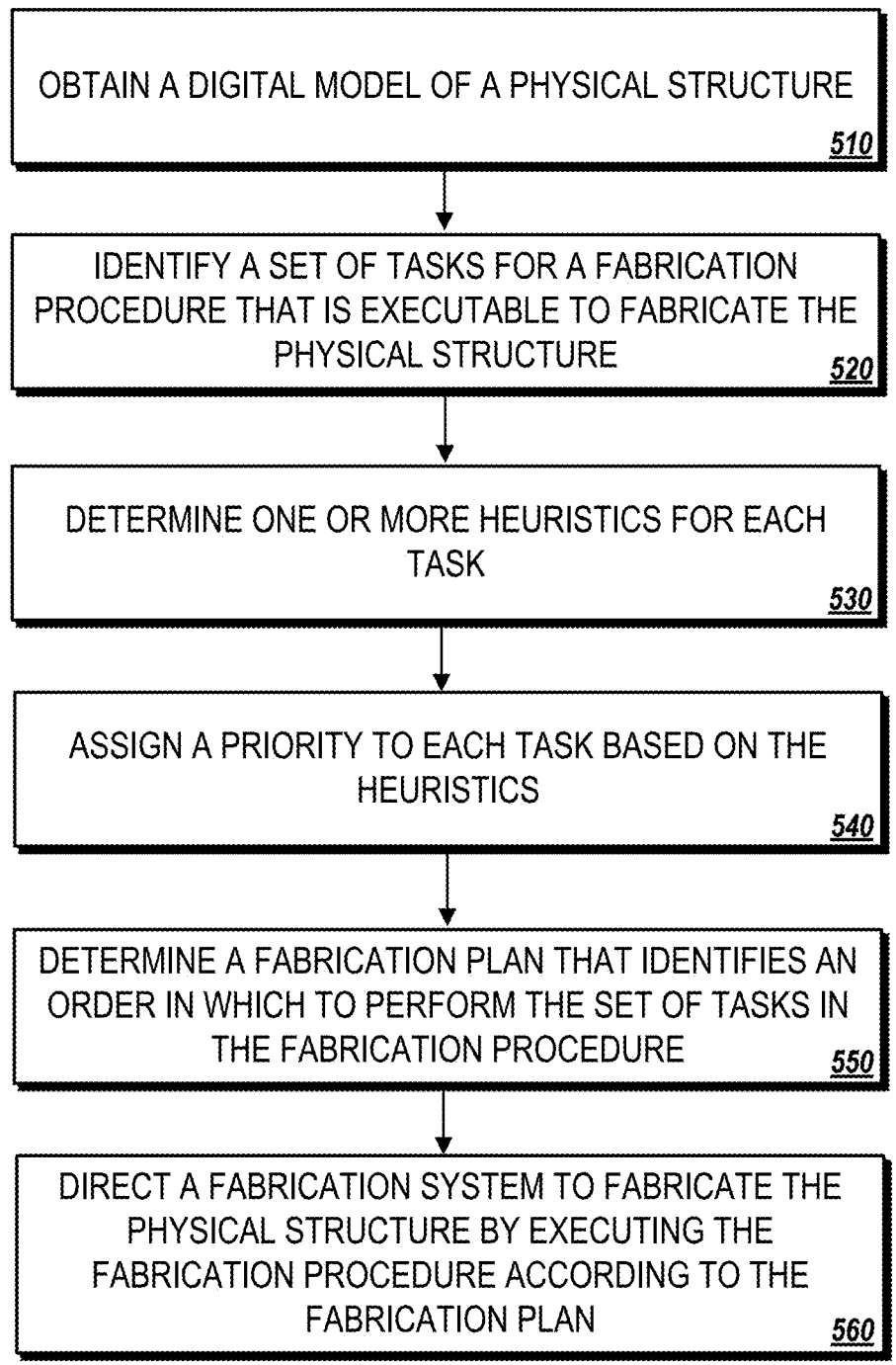
FIG. 5A illustrates an example of a process for adjusting the execution of an automated fabrication procedure.

FIG. 5A illustrates an example of a process 500A for generating a fabrication plan for an automated fabrication procedure. Briefly, the process 500A can include the operations of obtaining a digital model of a physical structure (510), identifying a set of tasks for a fabrication procedure that is executable to fabricate the physical structure (520), determining one or more heuristics for each task (530), assigning a priority to each task based on the heuristics (540), determining a fabrication plan that identifies an order in which to execute the set of tasks in the fabrication procedure (550), and directing a fabrication system to fabricate the physical structure by executing the fabrication procedure according to the fabrication plan (560).

The process 500A is generally described below in reference to FIG. 1 although any fabrication system that includes a preconfigured or custom workcell can be capable of executing the operations of the process 500A. Additionally, one or more of the operations of the process 500A can be executed by a computing system associated with a workcell, or alternatively, by a server system that is housed separately from the facility in which the fabrication system is location. As an example, the operations of the process 500A can be performed by the fabrication engine 110, which can be implemented on a central server system that exchanges data communications with the fabrication system 130 over any suitable network medium. As another example, the operations of the process 500A can be performed by software running on a computer that is configured to specifically direct and control the fabrication system 130 and is housed in the same facility as the fabrication system 130.

In more detail, the process 500A can include the operation of obtaining a digital model of a physical structure (510). For example, the model processing module 112 can obtain the digital model 102 from the designer system 120. As discussed above in reference to FIG. 1, the digital model 102 can identify components for a physical structure, an arrangement of the components in the physical structure, and a set of constraints for the physical structure. Examples of such constraints include geometric constraints (e.g., limitations on arranging or moving the components) or structural constraints (e.g., structural properties of the physical structure during or after assembly).

The process 500A can include the operation of identifying a set of tasks for a fabrication procedure that is executable to fabricate the physical structure (520). For example, the model processing module 112 of the fabrication engine 110 can generate the fabrication plan 106 for the physical structure. As discussed above, the fabrication plan 106 can identify a set of tasks that are identified by the model processing module 112 based on the constraints specified in the digital model 102. Each task can have a task specification that represents, for example, task-level execution criteria associated with execution of each individual task.

The process 500A can include the operation of determining one or more heuristics for each task (530). For example, the task planning module 116 can determine one or more heuristics for each task that is identified within the fabrication plan 106. As discussed above in reference to FIG. 3, the heuristics can include, for example, a fitness indicator representing a likelihood that a particular task will be successfully executed by the fabrication system 130, a complexity of executing the particular task, an estimation of resources necessary to execute the particular task, among others.

The heuristics can be used by the task planning module 114 to determine the feasibility of executing a fabrication plan. In some instances, where the task planning module 114 identifies multiple alternative fabrication plans, the heuristics can be used to identify an optical fabrication plan for the fabrication procedure. For instance, in the example depicted in FIG. 3, the task planning module 114 evaluates a cost function to select the fabrication plan that imposes the least amount of cost to the fabrication system 130. In this example, estimated resource cost is used as a heuristic indicator to identify the optical fabrication plan.

The process 500A can include the operation of assigning a priority to each task based on the heuristics (540). For example, the task planning module 114 can assign a priority to each task specified in the fabrication plan 106 based on the heuristics that are computed in step 530. As discussed above in reference to FIG. 4A, the priority assigned to a particular task can be based on, for example, a precision level for executing the particular task. For example, a task that is to be evaluated at a high precision level (e.g., low tolerance range for a predicted pose for a tool) can be assigned a high priority whereas a task that is to be evaluated at a low precision level (e.g., high tolerance range for a predicted pose for a tool) can be assigned a lower priority. In other instances, the priority assigned to a task can represent the importance of a particular task to the entire fabrication procedure. For example, a task that contributes to the structural integrity of the physical structure can be assigned with a higher priority than a task that represents an aesthetic feature of the physical structure. In some other instances, a priority assigned to a task can be based on the number of actions/operations that are necessary to be performed by the fabrication system such that labor-intensive tasks are assigned with higher priorities than non-labor-intensive tasks.

The process 500A can include the operation of determining a fabrication plan that identifies an order in which to execute the set of tasks in the fabrication procedure (550). For example, the task planning module 114 can identify a task sequence for executing the tasks that are identified in the fabrication plan 104. As discussed above, in some instances, the set of tasks can be performed purely sequentially by the fabrication system 130. In other instances, a certain subset of tasks, such as tasks that do not share dependencies, can be performed in parallel such that the fabrication system 130 is capable of performing multiple tasks at any given time point. For example, the fabrication plan 106 includes tasks (A), (B), (C), and (D). In this example, if (A) and (B) share dependencies and (C) and (D) share dependencies and (A) and (B) are not dependent on either (C) or (D), then the fabrication plan can specify the execution of tasks (A) and (C) in parallel, followed by the sequential execution of task (B) after the completion of task (B) and the sequential execution of task (D) after the completion of task (C).

The process 500A can include the operation of directing a fabrication system to fabricate the physical structure by executing the fabrication procedure according to the fabrication plan (560). For example, the task planning module 114 can generate the fabrication command 108 that is provided to the fabrication system 130 and used to direct the fabrication system 130 to fabricate the physical structure identified in the digital model 102.

Figure 5B:
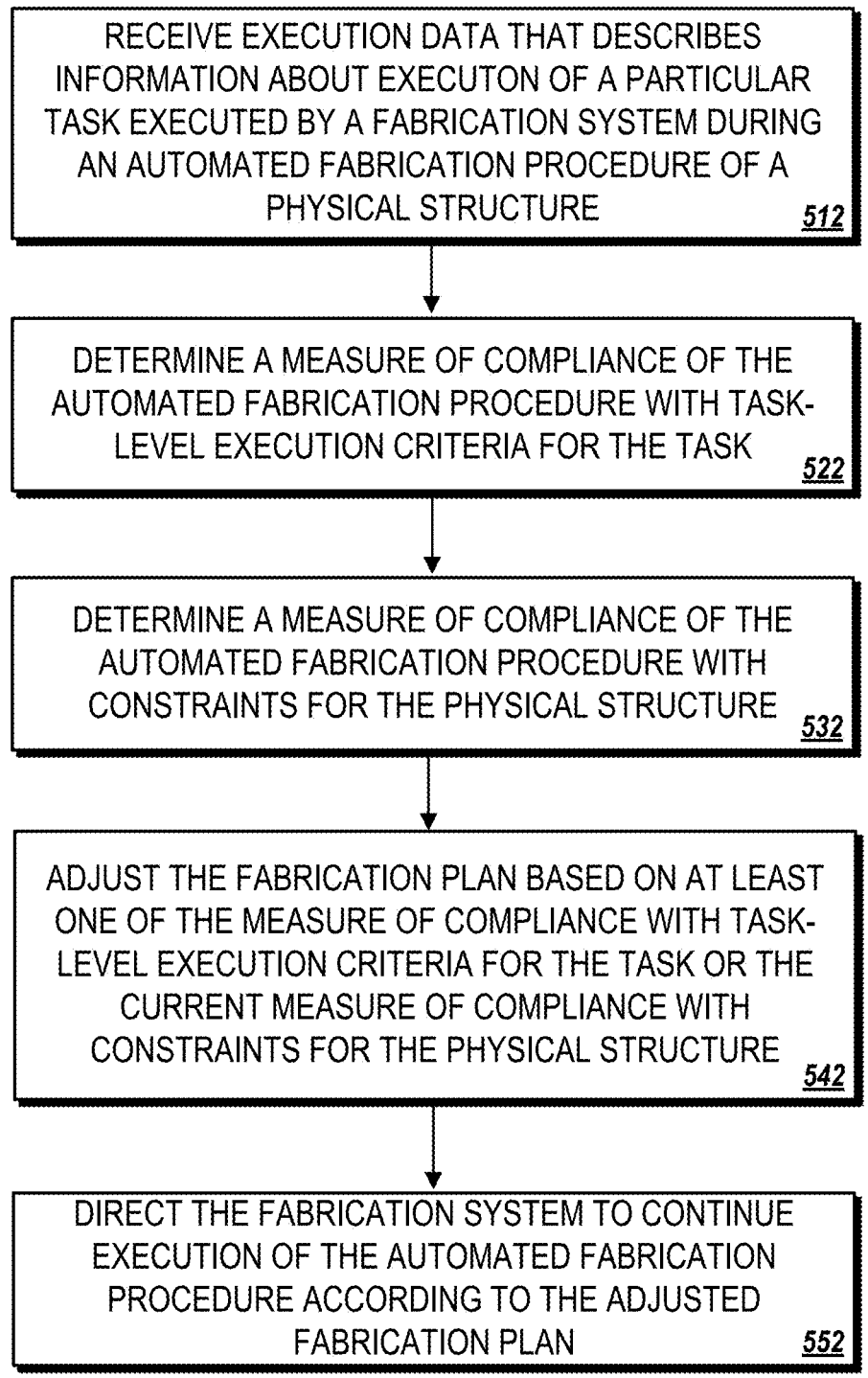
FIG. 5B illustrates an example of a process for generating a fabrication plan for an automated fabrication procedure.

FIG. 5B illustrates an example of a process 500B for adjusting the execution of an automated fabrication procedure. Briefly, the process 500B can include the operations of receiving execution data that describes information about execution of a particular task executed by a fabrication system during an automated fabrication procedure of a physical structure (512), determining a measure of compliance of the automated fabrication procedure with task-level execution criteria for the task (522), determining a measure of compliance of the automated fabrication procedure with a set of constraints for the physical structure (532), adjusting the fabrication plan based on at least one of the measure of compliance with the task-level execution criteria for the task or the current measure of compliance with the set of constraints for the physical structure (542), and directing the fabrication system to continue execution of the automated fabrication procedure according to the adjusted fabrication plan (552).

The process 500B is generally described below in reference to FIG. 1 although any fabrication system that includes a preconfigured or custom workcell can be capable of executing the operations of the process 500B. Additionally, one or more of the operations of the process 500B can be executed by a computing system associated with a workcell, or alternatively, by a server system that is housed separately from the facility in which the fabrication system is location. As an example, the operations of the process 500B can be performed by the fabrication engine 110, which can be implemented on a central server system that is exchanges data communications with the fabrication system 130 over any suitable network medium. As another example, the operations of the process 500B can be performed by software running on a configure that is configured to specifically configure and control the fabrication system 130 and is housed in the same facility as the fabrication system 130.

In more detail, the process 500B can include the operation of receiving execution data that describes information about execution of a task executed by a fabrication system during an automated fabrication procedure of a physical structure (512). For example, during the execution of the fabrication procedure by the fabrication system 130, the monitoring module 116 of the fabrication engine 110 can receive execution data 109. The execution data 109 can describe information about the execution of a task, such as motion of the fabrication system 130, the amount of time needed to perform the task, a present configuration of the fabrication system 130 after completing the task, or actual poses of tools that are manipulated by the fabrication system 130 in executing the task.

The process 500B can include the operation of determining a measure of compliance of the automated fabrication procedure with task-level execution criteria for the task (522). For example, the monitoring module 116 can determine a measure of compliance based on evaluating the information in the execution data 109 to task-level fabrication constraints that are specific to a task executed by the fabrication system 130. As discussed above, task-level fabrication constraints can represent constraints that are specific to an individual task within a set of tasks specified in the fabrication plan 106. For example, task-level execution criteria can be a tolerance range relative to a target pose value for a tool that is manipulated and/or moved by the fabrication system 130 while executing a task.

The process 500B can include the operation of determining a measure of compliance of the automated fabrication procedure with a set of constraints for the physical structure (532). For example, the monitoring module 116 can determine a measure of compliance based on evaluating the information in the execution data 109 to fabrication constraints specified in the digital model 102. As discussed above, fabrication constraints can represent constraints associated with the entire fabrication procedure. For example, fabrication constraints can represent a desired structural integrity of the physical structure, geometric relationships between components of the physical structure, among other types of constraints.

The process 500B can include the operation of adjusting the fabrication plan based on at least one of the measure of compliance with the task-level execution criteria for the task or the current measure of compliance with the set of constraints for the physical structure (542). For example, the monitoring module 116 can adjust the fabrication plan 106 based on at least one of the measure of compliance with the task-level execution criteria or the measure of compliance with the constraints. As discussed above, the adjustment can include replacing, removing, or adjusting a subsequent task to be performed by the fabrication system 130 during the fabrication procedure. In some instances, the monitoring module 116 can re-evaluate a fabrication plan for the fabrication procedure based on a present state of the fabrication system 130 after a task has been executed. For instance, the monitoring module 116 can discard a fabrication plan that was previously selected by the planning module 114 and instead select a different fabrication plan based on the execution data collected for a recently executed task.

In the example depicted in FIG. 2, the adjustment to the fabrication plan 106 involves replacing a task in the task sequence for the fabrication procedure such that a subsequent task to be executed by the fabrication system is adjusted during the fabrication procedure. As discussed above, in this example, the adjustment can be made because the monitoring module 116 determines that a recently executed task (e.g., task (A)) was not successfully executed and needs to be re-executed. In this example, the task (B) is replaced by task (B'), which represents a modified task (A) with adjusted input and output parameters based on the present configuration of the fabrication system 130 after executing the task (A).

In other examples, other types of adjustments can also be made. For example, monitoring module 110 can delete a task if it determines that execution of that task is no longer to be feasible given the information in the execution data 109. As another example, the monitoring module 110 can alter the execution criteria for a certain task if it determines that execution of that task is less likely to fit the execution criteria for the task in its task specification. For example, if a previously executed task has deviated from its predicted execution but is still within the tolerance range specified in its task specification, then the monitoring module 116 can adjust the predicted execution of the subsequent task and adjust the tolerance for the subsequent task based on the identified deviation in the prior task.

The process 500B can include the operation of directing the fabrication system to continue execution of the automated fabrication procedure according to the adjusted fabrication plan (552). For example, the monitoring module 116 can generate an adjusted fabrication command that is provided to the fabrication system 130 and used to direct the fabrication system 130 to fabricate the physical structure identified in the digital model 102 according to the adjusted fabrication plan. In the example depicted in FIG. 2, the monitoring module 116 generates an adjusted fabrication command 202B based on adjusting the original task sequence specified in the original fabrication command 202A. The adjusted fabrication command 202B is then used to direct the fabrication system 130 to continue execution of the fabrication command according to the adjusted task sequence.

Figure 5C:
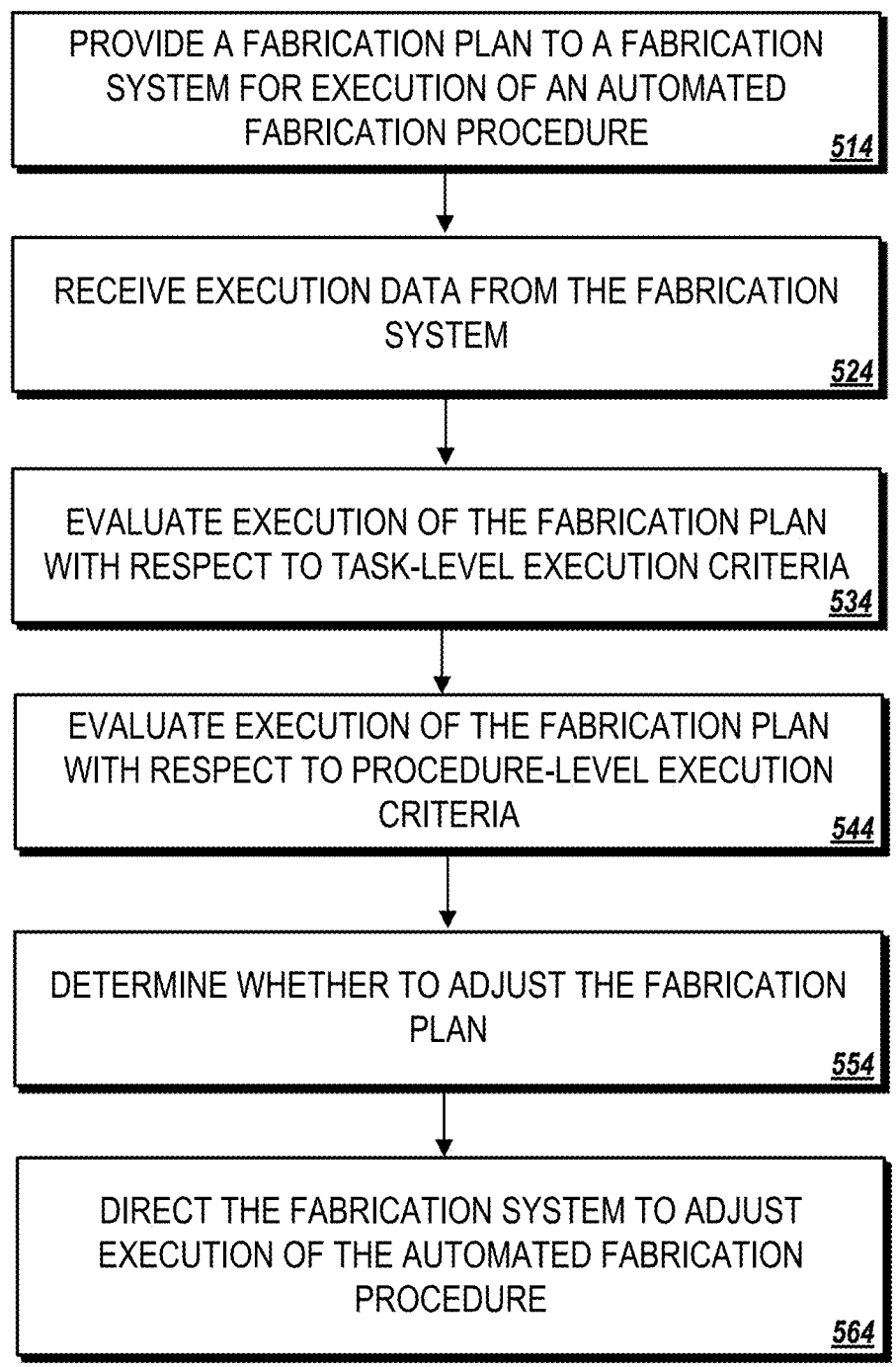
FIG. 5C illustrates an example of a process for adjusting a fabrication plan during an automated fabrication procedure.

FIG. 5C illustrates an example of a process 500C for adjusting a fabrication plan during an automated fabrication procedure. Briefly, the process 500C can include the operations of providing a fabrication plan to a fabrication system for execution of an automated fabrication procedure (514), receiving execution data from the fabrication system (524), evaluating execution of the fabrication plan with respect to task-level execution criteria (534), evaluating execution of the fabrication plan with respect to procedure-level execution criteria (544), determining whether to adjust the fabrication plan (554), and directing the fabrication system to adjust execution of the automated fabrication procedure (564).

The process 500C is generally described below in reference to FIG. 1 although any fabrication system that includes a preconfigured or custom workcell can be capable of executing the operations of the process 500C. Additionally, one or more of the operations of the process 500C can be executed by a computing system associated with a workcell, or alternatively, by a server system that is housed separately from the facility in which the fabrication system is location. As an example, the operations of the process 500C can be performed by the fabrication engine 110, which can be implemented on a central server system that is exchanges data communications with the fabrication system 130 over any suitable network medium. As another example, the operations of the process 500C can be performed by software running on a computer that is configured to specifically direct and control the fabrication system 130 and is housed in the same facility as the fabrication system 130. For example, the task planning module 114 can provide the fabrication plan 106 to the fabrication system 130. As discussed above, the fabrication plan 106 defines a set of tasks in an automated fabrication procedure for execution by the fabrication system 130 to fabricate a physical structure. In the example depicted in FIG. 1, the physical structure is identified in the digital model 102 and is to be assembled by the fabrication system 130 during the automated fabrication procedure using assembly components and according to fabrication constraints identified in the digital model 102.

In more detail, the process 500C can include the operation of providing a fabrication plan to a fabrication system for execution of an automated fabrication procedure (514). For example, the task planning module 114 can provide the fabrication plan 106 to the fabrication system 130. As discussed above, the fabrication plan 106 can identify a set of tasks that are identified by the model processing module 112 based on the constraints specified in the digital model 102. Each task can have a task specification that represents, for example, task-level execution criteria associated with execution of each individual task.

The process 500C can include the operation of receiving execution data from the fabrication system (524). For example, the monitoring module 116 can receive the execution data 109 from the fabrication system 130. For example, the monitoring module 116 can receive execution data 109, which describes information about execution of tasks by the fabrication system 130 during the automated fabrication procedure. As discussed above, the information included in the execution data 109 can reference motion of the fabrication system 130, the amount of time needed to perform a particular task, a present configuration of the fabrication system 130 after completing a task, or actual poses of tools that are manipulated by the fabrication system 130 in executing the task.

The process 500C can include the operation of evaluating execution of the fabrication plan with respect to task-level execution criteria (534). For example, the monitoring module 116 can evaluate, using the execution data 109, the execution of a task with respect to task-level execution criteria to determine a task-level execution performance metric. As discussed above, in some instances, the evaluation can include determining a measure of compliance of a recently executed task with respect to task-level fabrication constraints specified in the fabrication plan 106. For example, the task-level execution performance metric can represent a degree of compliance. In this example, a high degree of compliance indicates that the fabrication system 130 executed a task as specified in the fabrication plan 106 whereas a low degree of compliance indicates that the fabrication system 130 did not execute the task as specified in the fabrication plan 106. The task-level execution criteria can represent constraints that are specific to an individual task within a set of tasks specified in the fabrication plan 106. For example, task-level execution criteria can be a tolerance range relative to a target pose value for a tool that is manipulated and/or moved by the fabrication system 130 while executing a task.

The process 500C can include the operation of evaluating execution of the fabrication plan with respect to procedure-level execution criteria (544). For example, the monitoring module 116 can evaluate execution of a task with respect to procedure-level execution criteria to determine a procedure-level execution performance metric. As discussed above, the procedure-level execution criteria associated with the entire fabrication procedure. For example, such constraints can represent a desired structural integrity of the physical structure, geometric relationships between components of the physical structure, among other types of constraints. Thus, while the task-level execution criteria are specific to a particular task to be performed during an automated fabrication procedure, the procedure-level execution criteria can relate to multiple tasks that collectively impact the execution of the automated fabrication procedure. For example, if the execution of a subset of tasks have an impact on structural integrity of an assembled physical structure, then the performance metric can be used to determine whether the assembled physical structure has been properly assembled with the appropriate structural integrity.

The process 500C can include the operation of determining whether to adjust the fabrication plan (554). For example, the fabrication engine 110 can determine whether to adjust the fabrication plan 106 based on at least one of the task-level execution performance metric or the procedure-level execution performance metric. For example, in some instances, the fabrication engine 110 can determine to adjust the fabrication plan 106 based on the task-level performance metric for a particular task indicating that the execution of the particular task may require execution of additional subsequent tasks to satisfy the fabrication constraints specified in the digital model 102. In this example, the fabrication plan 106 is adjusted based on execution data for a single task. As another example, the fabrication engine 110 can determine to adjust the fabrication plan 106 based on the procedure-level performance metric indicating that a partially assembled physical structure requires further structural reinforcement. In this example, the fabrication plan 106 is adjusted based on execution data associated with the entire automated fabrication procedure.

The process 500C can include the operation of directing the fabrication system to adjust execution of the automated fabrication procedure (564). For example, if the fabrication engine 110 determines to adjust the fabrication plan 106 in step 554, the fabrication engine 110 can direct the fabrication system 130 to adjust execution of the automated fabrication procedure according to the adjusted fabrication plan. As discussed above, the adjustment can involve replacing a subsequent task within a task sequence specified in the fabrication plan 106 with a replacement task, adding a new task to the task sequence, adjusting the task-level execution criteria for an existing task in the task sequence, among others. In some instances, the adjustment can occur while the fabrication system 130 executes the automated fabrication procedure to allow dynamic procedural adjustments as discussed throughout.

Figure 6:
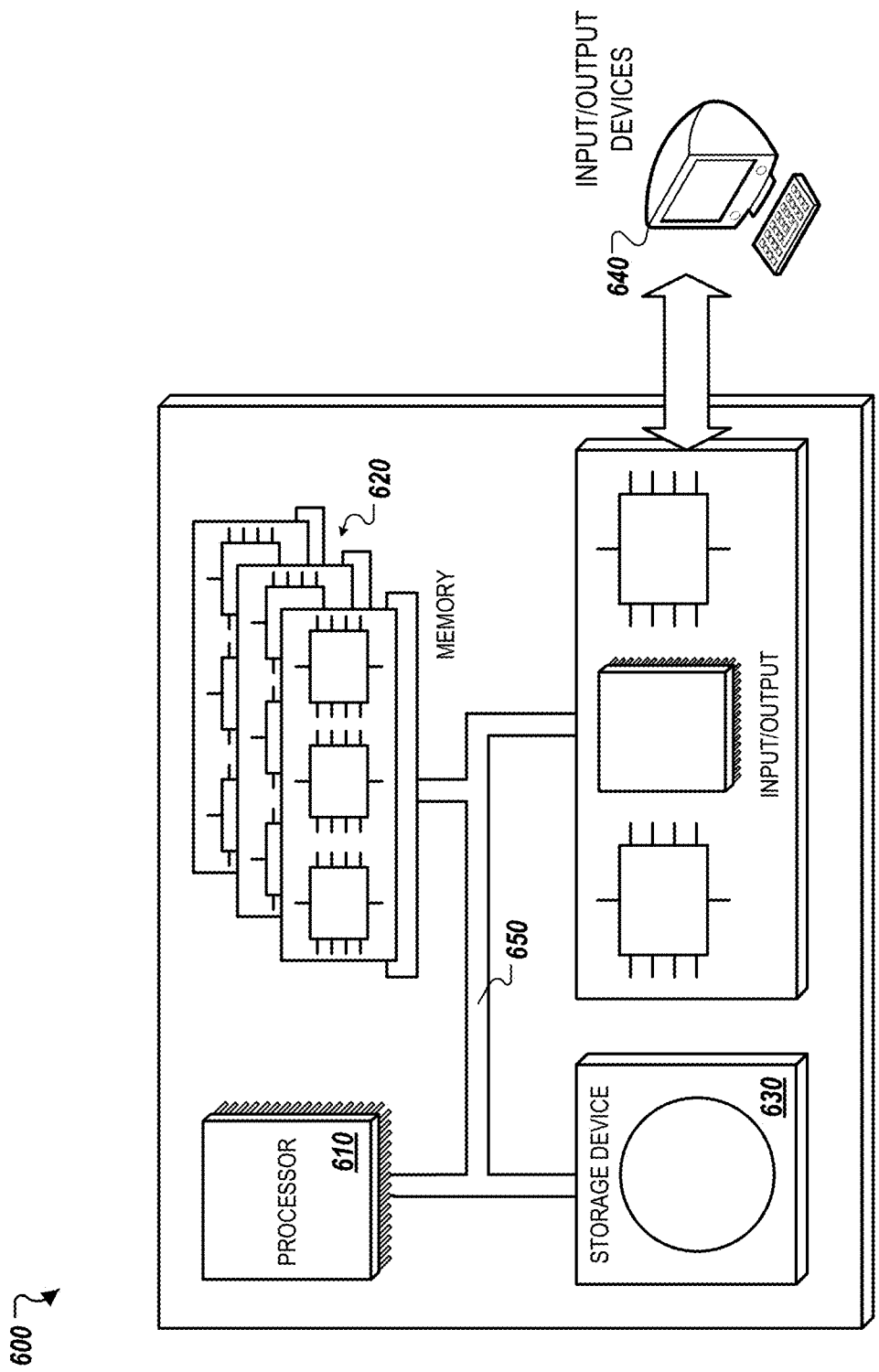
FIG. 6 illustrates an example of a computer system that may be applied to any of the computer-implemented methods and other techniques described herein.

FIG. 6 is a schematic diagram of a computer system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 600 includes a processor 610, a memory 620, a storage device 630, and an input/output device 640. Each of the components 610, 620, 630, and 640 are interconnected using a system bus 640. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
providing, by a computing system and to a fabrication system, a fabrication plan that defines a plurality of tasks in an automated fabrication procedure for execution by the fabrication system to fabricate a physical structure, wherein the fabrication plan is associated with one or more fabrication constraints that represent limitations on geometric relationships between a plurality of components of the physical structure;
evaluating, by the computing system and using execution data received from the fabrication system, execution of the fabrication plan with respect to the one or more fabrication constraints for the physical structure;
determining, after evaluating the fabrication plan using the execution data, that a geometric relationship between the plurality of components of the physical structure under fabrication does not comply with the one or more fabrication constraints of the fabrication plan;
in response, generating an alternative fabrication plan that adds a task to the fabrication plan, removes a task from the fabrication plan, or modifies a task of the fabrication plan; and
directing, by the computing system, the fabrication system to resume the fabrication of the physical structure using the generated alternative fabrication plan.

2. The method of claim 1, wherein generating an alternative fabrication plan comprises:
evaluating a plurality of alternative fabrication plans; and
based on the evaluation of the plurality of alternative fabrication plans, selecting an alternative fabrication plan, wherein:
in the selected alternative fabrication plan, the geometric relationships between the plurality of components of the physical structure comply with the one or more fabrication constraints, and
the selected alternative fabrication plan has been generated by updating the plurality of tasks of the fabrication plan, comprising one or more of: adding a task to the fabrication plan, removing a task from the fabrication plan, or modifying a task of the fabrication plan.

3. The method of claim 1, wherein the fabrication plan defines (i) task-level execution criteria and (ii) procedure-level execution criteria.

4. The method of claim 1, wherein:
the fabrication plan specifies a respective precision level for each task in the plurality of tasks, and wherein the selected alternative fabrication plan comprises a first task having an adjusted precision level.

5. The method of claim 1, wherein:
the fabrication plan specifies a sequence for executing the plurality of tasks during the automated fabrication procedure; and
the alternative fabrication plan adjusts the sequence for executing the plurality of tasks.

6. The method of claim 5, wherein generating an alternative fabrication plan comprises:
identifying a subsequent task within the sequence for executing the plurality of tasks after a particular task; and
adjusting, based on the execution data, the sequence for executing the plurality of tasks such that the subsequent task is replaced with a different task.

7. The method of claim 5, wherein generating an alternative fabrication plan comprises:
identifying a subsequent task within the sequence for executing the plurality of tasks after a particular task; and
adjusting, based on the execution data, task-level execution criteria for the subsequent task.

8. The method of claim 1, wherein the fabrication constraints comprise target pose values for one or more components of the plurality of components of the physical structure after execution of a particular task of the plurality of tasks of the fabrication plan.

9. The method of claim 8, wherein:
the execution data comprises actual pose values for the one or more components after the execution of the particular task; and
evaluating the execution of the fabrication plan comprises:
  evaluating the actual pose values for the one or more components and the target pose values for the one or more components; and
  determining a measure of compliance of the automated fabrication procedure with the fabrication constraints based on evaluating the actual pose values for the one or more components and the target pose values for the one or more components.

10. The method of claim 9, further comprising:
determining, by the computing system, that the measure of compliance of the automated fabrication procedure with the fabrication constraints does not satisfy a threshold compliance measurement; and
determining, by the computing system, that execution of the particular task was not successful based on the determination that the measure of compliance of the automated fabrication procedure with the fabrication constraints does not satisfy the threshold compliance measurement.

11. The method of claim 1, wherein the limitations on the geometric relationships between the plurality of components of the physical structure comprise limitations on one or more of (i) an arrangement of the plurality of components during execution of the fabrication plan or (ii) movement of the plurality of components during execution of the fabrication plan.

12. The method of claim 1, further comprising:
computing, by the computing system and based on the execution data, a state representing a present configuration of the fabrication system after execution of a particular task; and
computing, by the computing system and based on the execution data, a state representing a progress of the automated fabrication procedure after execution of the particular task; and
determining to adjust the fabrication plan based on the state representing the present configuration of the fabrication system and the progression of the progress of the automated fabrication procedure.

13. The method of claim 12, further comprising:
computing, by the computing system and based on the execution data, one or more heuristic indicators for a subsequent task to be executed after the particular task during the automated fabrication procedure; and
determining to adjust the fabrication plan based on the one or more heuristics indicators for the subsequent task.

14. The method of claim 13, wherein the one or more heuristic indicators comprises a fitness metric for the subsequent task representing a likelihood that the subsequent task will be successfully executed based on the state representing the present configuration of the fabrication system.

15. The method of claim 1, further comprising:
obtaining, by the computing system, a digital model of the physical structure, wherein the digital model identifies an arrangement of the plurality of components in the physical structure; and
generating, by the computing system and based on the digital model of the physical structure, the one or more fabrication constraints of the fabrication plan for the physical structure.

16. A system comprising one or more computers and one or more storage devices storing instructions that are operable, when executed by the one or more computers, to cause the one or more computers to perform operations comprising:
providing, by a computing system and to a fabrication system, a fabrication plan that defines a plurality of tasks in an automated fabrication procedure for execution by the fabrication system to fabricate a physical structure, wherein the fabrication plan is associated with one or more fabrication constraints that represent limitations on geometric relationships between a plurality of components of the physical structure;
evaluating, by the computing system and using execution data received from the fabrication system, execution of the fabrication plan with respect to the one or more fabrication constraints for the physical structure;
determining, after evaluating the fabrication plan using the execution data, that a geometric relationship between the plurality of components of the physical structure under fabrication does not comply with the one or more fabrication constraints of the fabrication plan;
in response, generating an alternative fabrication plan that adds a task to the fabrication plan, removes a task from the fabrication plan, or modifies a task of the fabrication plan; and
directing, by the computing system, the fabrication system to resume the fabrication of the physical structure using the generated alternative fabrication plan.

17. The system of claim 16, wherein generating an alternative fabrication plan comprises:
evaluating a plurality of alternative fabrication plans; and
based on the evaluation of the plurality of alternative fabrication plans, selecting an alternative fabrication plan, wherein:
  in the selected alternative fabrication plan, the geometric relationships between the plurality of components of the physical structure comply with the one or more fabrication constraints, and
  the selected alternative fabrication plan has been generated by updating the plurality of tasks of the fabrication plan, comprising one or more of: adding a task to the fabrication plan, removing a task from the fabrication plan, or modifying a task of the fabrication plan.

18. The system of claim 16, wherein the limitations on the geometric relationships between the plurality of components of the physical structure comprise limitations on one or more of (i) an arrangement of the plurality of components during execution of the fabrication plan or (ii) movement of the plurality of components during execution of the fabrication plan.

19. One or more non-transitory computer-readable storage media storing instructions that when executed by one or more computers cause the one or more computers to perform operations comprising:
providing, by a computing system and to a fabrication system, a fabrication plan that defines a plurality of tasks in an automated fabrication procedure for execution by the fabrication system to fabricate a physical structure, wherein the fabrication plan is associated with one or more fabrication constraints that represent limitations on geometric relationships between a plurality of components of the physical structure;
evaluating, by the computing system and using execution data received from the fabrication system, execution of the fabrication plan with respect to the one or more fabrication constraints for the physical structure;

determining, after evaluating the fabrication plan using the execution data, that a geometric relationship between the plurality of components of the physical structure under fabrication does not comply with the one or more fabrication constraints of the fabrication plan;

in response, generating an alternative fabrication plan that adds a task to the fabrication plan, removes a task from the fabrication plan, or modifies a task of the fabrication plan; and directing, by the computing system, the fabrication system to resume the fabrication of the physical structure using the generated alternative fabrication plan.

20. The non-transitory computer-readable storage media of claim 19, wherein generating an alternative fabrication plan comprises:

evaluating a plurality of alternative fabrication plans; and based on the evaluation of the plurality of alternative fabrication plans, selecting an alternative fabrication plan, wherein:

in the selected alternative fabrication plan, the geometric relationships between the plurality of components of the physical structure comply with the one or more fabrication constraints, and the selected alternative fabrication plan has been generated by updating the plurality of tasks of the fabrication plan, comprising one or more of: adding a task to the fabrication plan, removing a task from the fabrication plan, or modifying a task of the fabrication plan.

* * * * *